(12) United States Patent
Ito

(10) Patent No.: US 7,444,817 B2
(45) Date of Patent: Nov. 4, 2008

(54) OPTICAL MICROMOTOR, MICROPUMP USING SAME AND MICROVALVE USING SAME

(75) Inventor: Hirohito Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 10/864,483

(22) Filed: Jun. 10, 2004

(65) Prior Publication Data

US 2004/0251770 A1    Dec. 16, 2004

(30) Foreign Application Priority Data

Jun. 13, 2003    (JP)    ............................ 2003-168540

(51) Int. Cl.
   *F01K 25/02*    (2006.01)
(52) U.S. Cl. ......................... 60/650; 60/652
(58) Field of Classification Search .......... 60/682–683, 60/650, 652
   See application file for complete search history.

(56) References Cited

U.S. PATENT DOCUMENTS

| | | | | |
|---|---|---|---|---|
| 3,670,500 | A * | 6/1972 | Schultz ........................ | 60/682 |
| 4,792,283 | A | 12/1988 | Okayasu ..................... | 417/52 |
| 5,367,878 | A | 11/1994 | Muntz et al. ................. | 60/512 |
| 5,599,502 | A | 2/1997 | Miyazaki et al. ......... | 422/82.01 |
| 5,677,709 | A | 10/1997 | Miura et al. ................. | 345/161 |
| 5,886,684 | A | 3/1999 | Miura et al. ................. | 345/161 |
| 5,973,471 | A | 10/1999 | Miura et al. ................. | 318/640 |
| 6,071,081 | A | 6/2000 | Shiraishi ..................... | 417/52 |
| 6,721,472 | B2 | 4/2004 | Kim .............................. | 385/16 |
| 6,802,489 | B2 * | 10/2004 | Marr et al. ............. | 251/129.14 |
| 2002/0185592 | A1 | 12/2002 | Grier et al. .................. | 250/251 |
| 2003/0086790 | A1 | 5/2003 | Ma ............................. | 417/209 |

FOREIGN PATENT DOCUMENTS

| | | |
|---|---|---|
| JP | 60-155471 | 8/1985 |
| JP | 61-31679 | 2/1986 |
| JP | 3-274488 | 12/1991 |
| JP | 4-61195 | 2/1992 |
| JP | 04/272481 | 9/1992 |
| JP | 4-322183 | 11/1992 |
| JP | 04-322183 | 11/1992 |

(Continued)

OTHER PUBLICATIONS

J. Glückstad, et al., "Vision-Guided Manipulation of Colloidal Structures", Proc. of SPIE, vol. 5106, pp. 46-52 (2003).

*Primary Examiner*—Hoang M Nguyen
(74) *Attorney, Agent, or Firm*—Fitzpatrick, Cella, Harper & Scinto

(57) ABSTRACT

An optical micromotor having a rotor the rotation whereof can be controlled flexibly and freely through simple arrangement, and a micropump that uses this micromotor. The optical micromotor and the micropump have a rotor (15) that rotates about a central axis. The rotor (15) has an optical trap (bead) (2), which is trapped by a light beam (4), provided at least at one location thereon. When the optical trap (2) is irradiated with the laser beam (4), the rotor is held at a prescribed position together with the optical trap (2). When the laser beam (4) is moved or changed over, the rotor (15) rotates about the central axis together with the optical trap (2).

8 Claims, 3 Drawing Sheets

FOREIGN PATENT DOCUMENTS

| | | |
|---|---|---|
| JP | 4-331487 | 11/1992 |
| JP | 5-168265 | 7/1993 |
| JP | 5-240155 | 9/1993 |
| JP | 5-280500 | 10/1993 |
| JP | 6-50300 | 2/1994 |
| JP | 6-78572 | 3/1994 |
| JP | 7-002034 | 1/1995 |
| JP | 7-287172 | 10/1995 |
| JP | 08-061218 | 3/1996 |
| JP | 2001-252897 | 9/2001 |
| JP | 3274488 | 2/2002 |
| JP | 2002-228954 | 8/2002 |
| WO | WO 00/37165 | 6/2000 |
| WO | WO 02/38262 | 5/2002 |
| WO | WO 2004/016948 | 2/2004 |

\* cited by examiner

OPTICAL MICROMOTOR, MICROPUMP USING SAME AND MICROVALVE USING SAME

CLAIM OF PRIORITY

This application claims priority under 35 U.S.C. S119 from Japanese Patent Application No. 2003-168540, entitled "An Optical Micro-motor and an Micro-pump using it" and filed on Jun. 13, 2003, the entire contents of which are hereby incorporated by reference herein.

FIELD OF THE INVENTION

This invention relates to an optical micromotor, micropump, microvalve and methods of operating same ideal for use in fields where it is necessary to control a trace quantity of a liquid, such as in highly technical fields where cells and DNA are manipulated.

BACKGROUND OF THE INVENTION

A laser trapping technique is well known as a technique for trapping cells or DNA in liquids. This is based upon the following principle: Light is refracted or reflected at the surface of fine particles having a refractive index different from that of the surrounding medium, as a result of which there is a change in the momentum of the photons. This change in momentum is transferred to the fine particles according to the law of conservation of momentum, thereby producing a change in the momentum of the fine particles. As a result, a force acts upon the fine particles in the direction of the focal point of a laser beam and the particles are trapped at the focal point of the laser beam. The trapped particles can be manipulated by moving the focal point of the laser beam. Thus, since a laser beam can be focused by the objective lens of a microscope and fine particles trapped in the field of view, this technique is well suited to the manipulation of cells or DNA under a microscope.

Because the object of interest can be manipulated without making contact with it, this technique is characterized by the fact that it is not affected by mechanical accuracy and vibration as in the case of a mechanical manipulator. Further, it is also possible to use a so-called microtool such as microspheres of polystyrene as the object trapped. Manipulation of cells indirectly by causing them to attach themselves to a laser-trapped microtool also is being carried out.

Furthermore, the specifications of, e.g., Japanese Patent Application Laid-Open Nos. 5-168265 and 6-78572 propose applying a laser trap as the driving source of a pump or motor. The gist of these proposals is to trap a microrotor at a prescribed position using laser trapping and simultaneously apply a rotating force to the rotor by the radiation pressure of the laser beam (a change in momentum ascribable to reflection and refraction of light). The rotational driving force can be controlled by the strength of the radiation pressure of the laser beam. With these techniques, there is no need for a bearing because the rotor is trapped by laser trapping. Thus these techniques are advantageous in that they eliminate the effects of bearing friction and wear that were major problems in microdrive mechanisms according to the prior art.

Further, various driving mechanisms that use laser light are illustrated in the specification of Japanese Patent Application Laid-Open No. 4-322183.

On the other hand, however, the micromotors according to the prior art have the following drawbacks:

1) In a case where a laser beam is used both as the trapping light and driving light, a certain degree of laser-beam intensity is required for trapping. As a consequence, the driving light also comes to possess this intensity and therefore it is difficult to rotate the rotor at low speed and to stop the rotor. Further, angle of rotation cannot be controlled freely because the rotor is rotated by radiation pressure.

2) In a case where the laser beam is not used both as the trapping light and driving light, it is required that the rotor be irradiated with the laser beam from a different direction. As a consequence, the structure for laser-beam irradiation is a complicated one. Alternatively, it is necessary to provide separate means for supporting the rotary shaft.

Accordingly, the present invention is to provide an optical micromotor having a rotor that can be controlled flexibly and freely through a simple structure, a micropump that uses this micromotor, and methods of manipulating these.

SUMMARY OF THE INVENTION

The present invention has been devised in view of the problems mentioned above and provides an optical micromotor having a rotor that rotates about a central axis of rotation, comprising: a rotor having an optical trap, which will be trapped by a light beam, at least at one location thereon; at least one light beam for irradiating the optical trap; the central axis of rotation, which is positioned at a prescribed position by holding the optical trap by the light beam; and means for moving or changing over the light beam in such a manner that the rotor will rotate about the central axis of rotation together with the optical trap.

Further, a micropump according to the present invention includes a micromotor, which has the structure described above, provided in a duct through which a liquid is passed, flow of the liquid through the duct being controlled by rotation of the rotor.

Furthermore, a microvalve according to the present invention includes a micromotor, which has the structure described above, provided in a duct through which a liquid is passed, flow of the liquid through the duct being controlled by rotation of the rotor and stopping of the rotor at a prescribed position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail with reference to the accompanying drawings.

First Embodiment

Figure 1A:
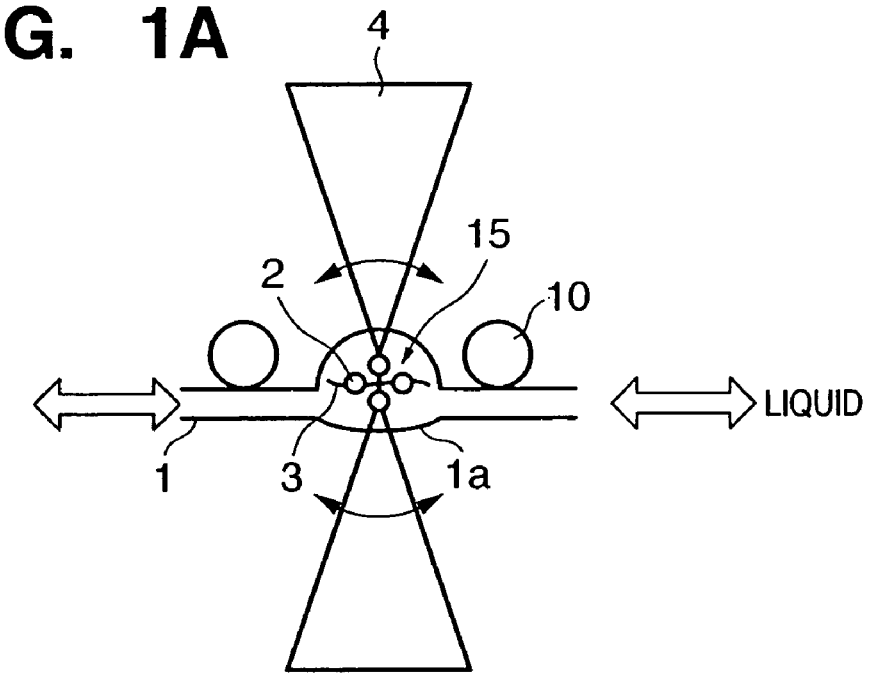
FIGS. 1A and 1B are top views of a micropump or micromotor according to a first embodiment of the present invention.
Figure 1B:
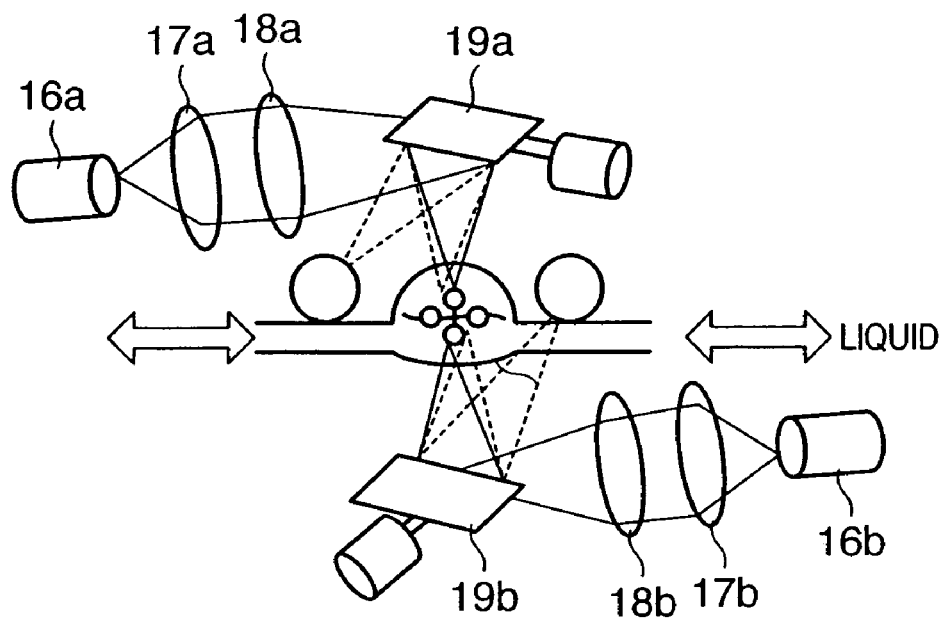

FIG. 1A schematically illustrates a micropump according to a first embodiment of the present invention, and FIG. 1B schematically illustrates on example of means for moving a laser beam. FIGS. 1A and 1B are top views, in which a laser beam 4 is emitted along the direction perpendicular to the plane of the drawing. To facilitate the description, however, the laser beam 4 is drawn transversely in the diagrams.

In this embodiment, a rotor 15 serving as a micromotor is sealed in part (a cylindrical chamber 1a) of a slender duct 1 fabricated from a material such as glass through which a laser beam passes. The rotor 15 comprises spherical beads 2, which consist of polystyrene or the like, for a light trap, and blades 3 for feeding a liquid. The refractive index of the beads 2 has been set so as to be different from that of the surrounding medium, namely the medium (liquid) in surface contact with the trap. The blades 3 of this embodiment comprise a resin or the like and extend radially outward from the center of rotation in four directions spaced apart by equal angles (90 degrees). The beads 2 have been affixed to respective ones of the radially extending blades 3. In FIG. 1A, the blades 3 extend in four directions and four of the beads 2 have been affixed. However, as long as there is rotational symmetry with respect to the central axis of rotation, the invention is not limited to four directions and four beads. The blades 3 are rigid to the extent that they maintain their shape to a degree that conforms to the particular objective (feed of a liquid having a certain degree of viscosity or feed of an object such as a cell through a liquid) even though they are rotated in the liquid. The diameter of the blades 3 is large enough for the blade tips to lightly contact the wall surface of the cylindrical chamber la or for the blade tips to have some clearance between themselves as the wall surface. If the blades make contact too strongly, frictional resistance at the time of rotation will be too large and so will cause some problems. Conversely, if a clearance that is too large is provided, this is undesirable because pumping efficiency will decline. However, in a case where the apparatus is used to feed cells in a liquid (where the cells have a size of several microns to several hundred microns) and not a liquid itself, the cells must slip through a gap between the tips of the blades 3 and the wall surface of the cylindrical chamber 1a and therefore the diameter of the blades should be designed accordingly. For example, in the case of red corpuscles, size is in the order of 9 μm. However, since these cells have a flat configuration, a gap of less than 1 μm is required. Since an ovum, which is the cell of largest size, has a size on the order of 100 μm, the apparatus can function satisfactorily even with a gap of 20 to 30 μm.

The operation of the micropump will be described with reference to FIG. 1B. The beads 2 on the blades 3 are irradiated with the laser beam 4 from a direction substantially parallel to the central axis of rotation of the rotor 15 (the direction perpendicular to the plane of the drawing), and the rotor 15 is trapped and positioned at a prescribed position in the chamber 1b of the duct 1. The laser beam 4 is capable of having the position irradiated by light, which has been emitted from a laser light source 16a, changed by a galvanometer mirror 19a via a parallel lens 17a and condensing lens 18a. A plurality of the beads 2 can be trapped one after another. Further, by using a plurality of laser light sources 16a, 16b, light emitted from the laser light sources 16a, 16b may be employed to trap a plurality of the beads 2 simultaneously by galvanometer mirrors 19a, 19b via collimator lenses 17a, 17b and condenser lenses 18a, 18b, respectively. If the laser beam 4 is moved with the beads 2 held trapped, the rotor 15 having the beads 2 also will move as the laser beam moves. By moving the laser beam 4 in circular form (see the black arrows in FIG. 1A) while it is maintained substantially parallel to the central axis of rotation of the rotor 15, the beads 2 undergo circular motion and therefore the rotor 5 is caused to rotate about its center. To move the laser beam 4 circularly, it will suffice to deflect the light from the laser light source by deflectors such as the two galvanometer mirrors 19a, 19b, which have mutually perpendicular axes of rotation and whose rotational phases have been set appropriately. In order to achieve smooth rotation about a stable center of rotation, it is preferred that the beads 2 that will be trapped and made to undergo rotational motion be changed over one after another or that a plurality of the beads 2 be trapped and made to undergo rotational motion simultaneously using a plurality of laser beams 4. For example, two beads 2 are located at positions that are symmetrical with respect to the center of rotation. After one of these beads has been irradiated with the laser beam and caused to move in the direction of rotation, the laser beam is changed over and the other of the beads is irradiated with the laser beam and caused to move in the direction of rotation. By repeating this operation successively at intervals that are as short as possible, the rotor can be rotated more smoothly. Alternatively, two laser beams may be emitted simultaneously and caused to move in the direction of rotation, thereby generating a couple with respect to the rotor 15. As a result, the rotor can be rotated smoothly. In this case, the central axis of rotation of the rotor 15 substantially coincides with (is substantially parallel to) the direction of emission of the laser beam 4.

The direction of rotation of the rotor 15, its angle of rotation, rotational speed and intermittence of rotation can be controlled freely by controlling the movement of the laser beam 4. If the laser beam 4 is not allowed to move, the rotation of the rotor 15 can be halted with the beads 2 kept in the trapped state. Further, it is also possible to rotate the rotor 15 at low speed with the intensity of the laser beam being kept large enough for trapping. Since the angle of rotation also can be freely controlled, a method of use in which the rotor 15 is positioned at any prescribed position in the manner of a stepping motor also is possible. It is not necessary to change the intensity of the laser beam 4 in order to change the angle of rotation of the rotor 15. However, the maximum speed of the rotor 15 in a liquid is limited by the intensity of the laser beam 4 (the trapping force of the beads 2 is decided by the beam intensity and therefore so is the maximum rotational speed of the rotor 15 that can withstand this), the fluid resistance within the duct 1 and the viscosity of the liquid, etc.

The arrangement of the micropump of the present invention is capable of being used as a microchip fluid control mechanism employed in a μ-TAS (μ-Total Analysis System) that makes it possible to miniaturize devices and techniques for chemical analysis and synthesis, etc., by utilizing micromachine technology. By utilizing the fact that the rotational angle of the rotor 15 can be controlled freely, it is possible to use the micropump in applications for successively feeding not only liquids but also objects such as cells suspended in a medium.

In a case where the micropump of the present invention is used as a microtool, positioning beads 10 for laser trapping are disposed on the duct 1 at suitable locations, as shown in FIG. 1A. By laser trapping the beads 10, the above-described micropump can be positioned freely in the medium. It is possible for the micropump to be positioned in any attitude by providing a plurality of the positioning beads 10. The light source can be used jointly for the fluid-control laser light that strikes the beads 2 on the rotor 15 and for the trapping laser light that strikes the positioning beads 10. (The reason for this is that since the laser beam 4 for fluid control also performs a trapping function, it is required to have the corresponding intensity. Even so, low-speed rotation of the rotor 15 is unhindered.) It is therefore unnecessary to add on special equipment for positioning the micropump. This makes it possible to simplify the structure of the apparatus.

Further, unlike mechanical manipulators used conventionally, laser trapping is such that a micropump is positioned in the field of view of a microscope and therefore can be position easily and in highly precise fashion. Since the positioning beads are aligned automatically at the focal point of the laser beam even in the height direction, the micropump can readily be positioned at a height that same as that of the microscope field of view.

In a optical micromotor according to this embodiment, beads serving as the optical trapping portion are disposed even at the rotor center of rotation and this portion is fixedly irradiated with a laser beam from a direction that is substantially parallel to the central axis of rotation so that the position of the rotor center of rotation can be held substantially immobile. Since the rotor center of rotation is placed in the immobile state in this case, the rotor can be made to rotate smoothly and with good controllability if beads placed at least at one location other than the center of rotation are irradiated with a laser beam from a direction substantially parallel to the central axis of rotation and the laser beam is made to move about the central axis of rotation.

Second Embodiment

Figure 2A:
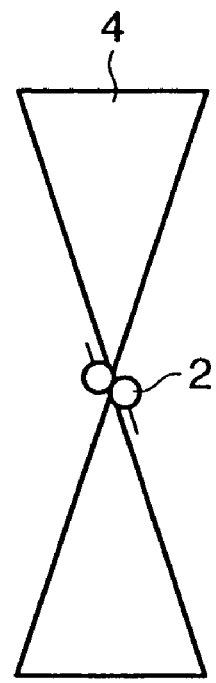
FIGS. 2A and 2B are diagrams useful in describing the operation of a micropump or micromotor according to a second embodiment of the present invention.
Figure 2B:
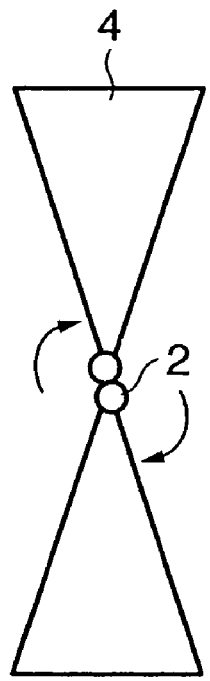

FIGS. 2A and 2B are diagrams useful in describing the principle of operation of a micropump or motor according to a second embodiment of the present invention. In a case where twin ganged beads 2 are irradiated with the laser beam 4 so as to be partially struck by the beam, as shown in FIG. 2A, it is known that the beads 2 will rotate in such a manner that the direction of the long axis of the beads 2 will align with the irradiating direction of the laser beam 4 at the shortest distance, as illustrated in FIG. 2B. A similar phenomenon is observed even with beads of an elliptical shape having a major axis.

Figure 3:
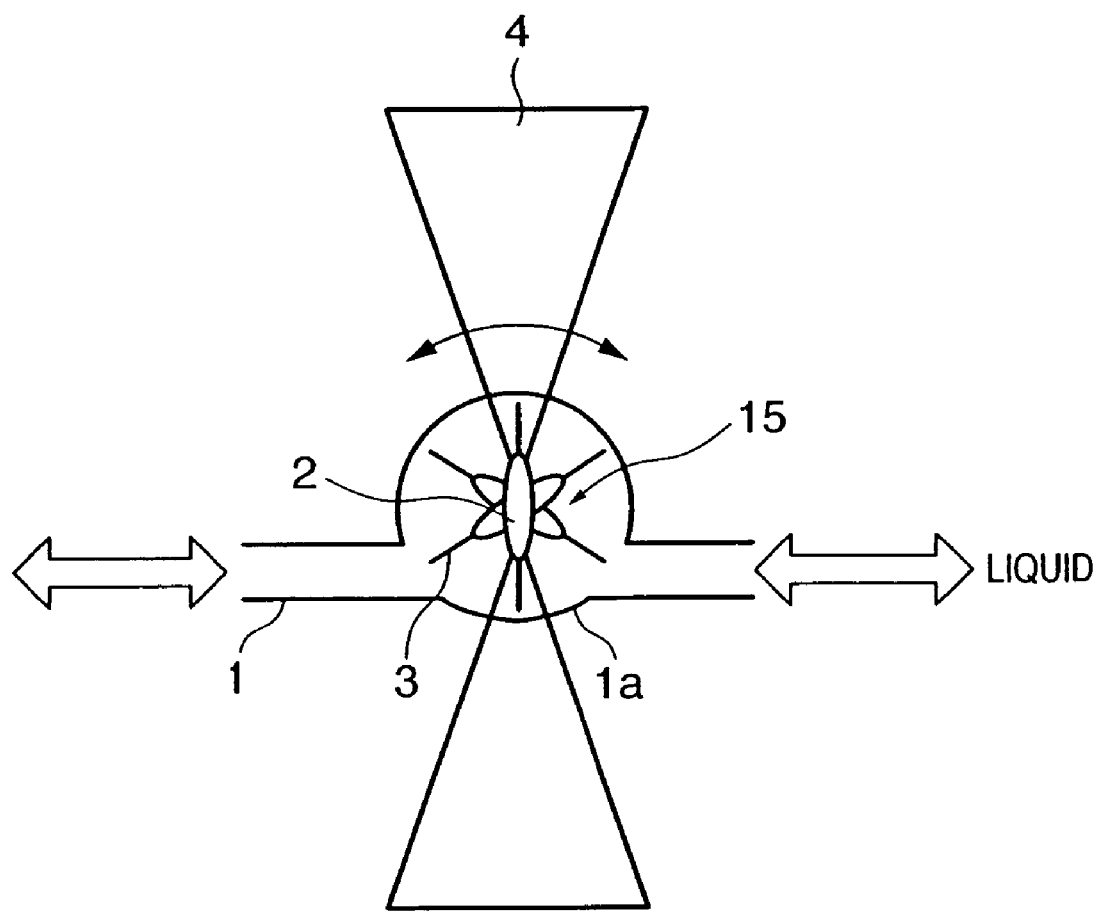
FIG. 3 is a side view of a micropump according to the second embodiment of the present invention.

FIG. 3 is a schematic view of a micropump that uses elliptically shaped beads 2 in accordance with the second embodiment of the invention. This embodiment is based upon the principle described above. In FIG. 3, the irradiating direction of the laser beam 4 is a direction within the plane of the drawing (a direction substantially at right angles to the central axis of rotation of the rotor 15).

This embodiment differs from the first embodiment in that three or more sets (three in the illustration) of elliptical beads 2 (or twin ganged beads 2 as in FIG. 2) are provided equiangularly about the center of rotation of rotor 15. The elliptical beads 2 are each offset slightly in the direction perpendicular to the plane of the drawing, overlap at the center and extend in the direction perpendicular to the central axis of rotation of the rotor 15. Owing to optical trapping, the elliptical beads 2 are not only positioned but also have the directions of the their major axes aligned with the axis of the laser beam 4. As a result, the rotor 15 can be rotated. However, in order to rotate the rotor 15 in any direction with good controllability, it is required that at least three sets of the beads 2 be coupled upon changing their major-axis direction by, e.g., 60 degrees from one set to the next. The reason for this is as follows: If two sets of beads are coupled at an angular spacing of 90 degrees, the axis of the laser beam and the major axes of the beads will intersect at right angles when the bead trapped shifts from one to the other. As a result, in which direction beads will rotate to achieve alignment between the laser beam and the major axis will not be decided in stable fashion and rotation of the rotor will become unstable.

The operation of this embodiment will now be described. The rotor 15 can be rotated through angular increments of 60 degrees by shifting the laser beam 4, whose irradiating direction lies in the plane of the drawing, along the direction perpendicular to the plane of the drawing to thereby successively trap the three sets of beads 2. More specifically, if, starting from the state shown in FIG. 3, the laser beam 4 is shifted downward slightly along the direction perpendicular to the drawing and arrives in a plane the same as that of the bead 2 extending, e.g., from the upper right to the lower left, then this bead 2 will rotate through an angle of 60 degrees in the counter-clockwise direction so as to align its axis with the laser beam 4. On the other hand, if the laser beam 4 arrives in a plane the same as that of the bead 2 extending from the upper left to the lower right, then this bead 2 will rotate through an angle of 60 degrees in the clockwise direction so as to align its axis with the laser beam 4. Thus, unlike the first embodiment, it will suffice for the laser beam 4 to trap only the position of each bead 2 discretely. This means that the control mechanism for control along the irradiating direction of the light from the light source is simplified. As mentioned above, the central axis of rotation of the rotor 15 takes on a direction (perpendicular to the plane of the drawing) at right angles to the irradiating direction of the laser beam 4.

The operation of this embodiment is similar to that of a stepping motor in which the number of steps is decided by the number sets of twin ganged beads or elliptical beads. The stepping angle will be 60 degrees if three sets of beads are used and 45 degrees if four sets are used. This embodiment is similar to the first embodiment is other respects.

With the optical micromotor of this embodiment, a rotational moving method also is possible. Specifically, only a single optical trap having such a shape that its major axis lies at right angles to the central axis of rotation of the rotor 15 is disposed on this axis, this optical trap is irradiated with a light beam from a direction substantially at right angles to this central axis of rotation and the light beam is changed over about the central axis of rotation. The optical trap is moved about the central axis of rotation in such a manner that the major axis of the trap is aligned at the shortest distance with the irradiating direction of the light beam changed over, and the rotor is caused to rotate about its central axis together with the optical trap. Hence the micromotor is capable of operating in the manner of a stepping motor. The number of irradiating light beams changed over at equiangular intervals need only be decided in accordance with the design and the number of light sources necessary should be prepared accordingly. With this method, a small number of beads will suffice and the light beam need not be moved. However, a plurality of light sources will be necessary.

The micromotor can be used also as a valve by employing the motor feature that allows it to be positioned at any position (angle). By changing the length and breadth orientation of the duct, the micromotor can be used as an on/off valve for interrupting a fluid. It can also be used as a changeover valve for changing over a duct through which a fluid flows.

Thus, as described above, a micropump or motor according to the present invention is so adapted that by suitably moving or changing over light that strikes the optical trap of a rotor, the trap is moved to move and rotate the rotor. As a result, it is possible to rotate the rotor flexibly through a comparatively simple arrangement. Accordingly, a micropump having such a micromotor is capable of feeding liquid, or an object contained in the liquid, in flexible fashion.

Further, a rotor in a micromotor according to the present invention can be adapted to have a rotor having an optical trap, which will be trapped by a light beam, at least at one location on a central axis of rotation other than at the center of rotation, at least one light beam for irradiating the optical trap from a direction substantially parallel to the central axis of rotation, and means for moving or changing over the light beam about the central axis of rotation in such a manner that the rotor will rotate about the central axis of rotation together with the optical trap. More specifically, the rotor can have a plurality of optical trapping beads as optical traps disposed in rotational symmetry with respect to the central axis of rotation (see the first embodiment). In this case, the central axis of rotation is not provided at its center with an optical trap; instead, a plurality of optical traps are provided about the axis. On the other hand, the rotor can have an optical traps, which are trapped by a light beam, also at the central portion on the central axis of rotation. In this case, the optical trap at the center is used with the position of the center of the rotor being held substantially immobile. With regard to the other optical traps, therefore, at least one will suffice and it will suffice if this optical trap is irradiated with a light beam that is moved about the central axis of rotation.

Further, the rotor can be adapted to have a plurality of blades-extending radially outward from the center of rotation on the central axis of rotation, and an optical trapping bead serving as the optical trap is affixed to at least one of the blades. The plurality of blades can be arranged to extend radially at an equiangular spacing (see the first embodiment).

Furthermore, the rotor can be adapted to have at least one optical trap, at the center of rotation on the central axis of rotation, trapped by a light beam and having such a shape that its major axis lies at right angles to the central axis of rotation. When this optical trap is irradiated with the light beam from a direction substantially at right angles to this central axis of rotation, the optical trap is moved the shortest distance about the central axis of rotation in such a manner that the direction of the major axis of this trap aligns with the irradiating direction of the light beam, and the rotor is caused to rotate about the central axis of rotation together with the optical trap. More specifically, the rotor is equipped with three or more sets of multiple ganged beads (typically twin ganged beads) or elliptical beads as optical traps, and the beads are disposed in such a manner that their major axes intersect the central axis of the rotor at right angles and are equiangularly spaced (see the second embodiment). In such case the optical traps irradiated with the light are changed successively (in this case, it is necessary to provide a plurality of optical traps), or the light beam that irradiates the optical trapping portion is changed over (in this case, it will suffice if at least one optical trap is provided), whereby the rotor is moved and rotated. As a result, operation in a manner similar to that of a stepping motor is possible.

Furthermore, a micropump according to the present invention has the above-described optical micromotor provided in a duct through which a liquid is passed, characterized in that the flow of the liquid through the duct is manipulated by rotating the rotor. With a micropump having the above-described micromotor in which the rotor is rotated flexibly and freely, the liquid or an object in the liquid can be fed flexibly and freely. As a result, the micropump can be used for flexible manipulation of a trace amount of fluid.

The duct can be provided with a plurality of positioning optical traps and the micropump itself can be positioned by the optical trapping of the positioning optical traps. As a result, the micropump per se can be positioned easily, freely and flexibly by optical trapping without the addition of special equipment.

Furthermore, a microvalve according to the present invention has the above-described optical micromotor provided in a duct through which a liquid is passed, characterized in that the flow of the liquid through the duct is manipulated by rotating the rotor.

The duct can be provided with a plurality of positioning optical traps and the microvalve itself can be positioned by the optical trapping of the positioning optical traps.

The present invention is not limited to the above embodiments, and various changes and modifications can be made within the spirit and scope of the present invention. Therefore, to apprise the public of the scope of the present invention, the following claims are made.

What is claimed is:

1. An optical micromotor having a rotor that rotates about a central axis of rotation, comprising:
    a beam generator for generating a light beam;
    a beam irradiation controller for controlling irradiation with the light beam generated by said beam generator; and
    a rotor having an optical trap, which is trapped by the light beam, provided at least at one location thereon;
    wherein said beam irradiation controller irradiates the optical trap with the light beam from a direction substantially parallel to the central axis of rotation and imparts to the optical trap a circular motion by moving the light beam in a circular form, thereby positioning the central axis of rotation at a prescribed position; and
    wherein said beam irradiation controller moves the light beam in such a manner that the rotor rotates about the central axis of rotation together with the optical trap.

2. The micromotor according to claim 1, further comprising a rotor having an optical trap, which is trapped by the light beam, provided at least at one location on a central axis of rotation other than the center of rotation thereof;
    wherein said beam irradiation controller makes a position of the central axis of rotation in an immobile state by irradiating the at least one light beam to the optical trap without moving the at least one light beam from a direction substantially parallel to the central axis of rotation.

3. An optical micromotor having a rotor that rotates about a central axis of rotation, comprising:
    a beam generator for generating at least one light beam;
    a beam irradiation controller for controlling irradiation with the light beam generated by said beam generator; and
    a rotor having at least one optical trap, which has such a shape that its major axis aligns in a direction perpendicular to the central axis of rotation, and wherein
    the beam irradiation controller irradiates the at least one light beam from a direction substantially at right angles to the central axis of rotation, and thereby the rotor is caused to rotate about the central axis of rotation when the major axis of the optical trap is shifted to the direction of irradiating the light beam.

4. An optical micromotor having a rotor that rotates about a central axis of rotation, comprising:
    a beam generator for generating at least one light beam;

a beam irradiation controller for controlling irradiation with the at least one light beam generated by said beam generator; and a rotor having an optical trap, having multiple ganged beads or elliptical beads as said optical traps;

which are placed in a direction of the central axis in such a manner that major axes thereof intersect the central axis of said rotor at right angles and are equiangularly spaced, wherein the beam irradiation controller shifts a position of irradiating to a direction of the central axis of rotation, and thereby the rotor is caused to rotate about the central axis of rotation when a position of at least one of said multiple ganged beads or elliptical beads is moved.

5. The micromotor according to claim 1, wherein said rotor has a plurality of blades extending radially outward from the center of rotation on the central axis of rotation, and at least one of said blades has said optical trap.

6. A micropump, comprising:

an optical micrometer comprised of:

a beam generator for generating a light beam, a beam irradiation controller for controlling irradiation with the light beam generated by said beam generator, and a rotor having an optical trap, which is trapped by the light beam, provided at least at one location thereon, wherein said beam irradiation controller irradiates the optical trap with the light beam from a direction substantially parallel to the central axis of rotation and imparts to the optical trap a circular motion by moving the light beam in a circular form, thereby positioning the central axis of rotation at a prescribed position, and wherein said beam irradiation controller moves the light beam in such a manner that the rotor rotates about the central axis of rotation together with the optical trap, wherein said optical micromotor is provided in a duct through which a liquid is passed, wherein the flow of the liquid through said duct is manipulated by rotating said rotor.

7. The micropump according to claim 6, wherein said duct has a plurality of positioning optical traps, said micropump being made positionable by optical trapping of said positioning optical traps.

8. A microvalve, comprising:

an optical micrometer comprised of:

a beam generator for generating a light beam, a beam irradiation controller for controlling irradiation with the light beam generated by said beam generator, and a rotor having an optical trap, which is trapped by the light beam, provided at least at one location thereon, wherein said beam irradiation controller irradiates the optical trap with the light beam from a direction substantially parallel to the central axis of rotation and imparts to the optical trap a circular motion by moving the light beam in a circular form, thereby positioning the central axis of rotation at a prescribed position, and wherein said beam irradiation controller moves the light beam in such a manner that the rotor rotates about the central axis of rotation together with the optical trap, wherein said optical micromotor is provided in a duct through which a liquid is passed, wherein the flow of the liquid through the duct is manipulated by rotating the rotor and stopping the rotor at a prescribed position.

* * * * *